US008483728B2

(12) United States Patent
Feng et al.

(10) Patent No.: US 8,483,728 B2
(45) Date of Patent: Jul. 9, 2013

(54) DEVICE AND METHOD FOR PROCESSING SHORT MESSAGE SERVICE

(75) Inventors: Li Feng, Nanjing (CN); Zhihong Wang, Nanjing (CN); Lei Shi, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/432,663

(22) Filed: Mar. 28, 2012

(65) Prior Publication Data

US 2012/0184251 A1 Jul. 19, 2012

Related U.S. Application Data

(63) Continuation of application No. PCT/CN2010/077716, filed on Oct. 13, 2010.

(30) Foreign Application Priority Data

Oct. 15, 2009 (CN) .......................... 2009 1 0206835

(51) Int. Cl.
*H04W 4/00* (2009.01)

(52) U.S. Cl.
USPC .......................................................... 455/466

(58) Field of Classification Search
USPC .......................................................... 455/466
See application file for complete search history.

(56) References Cited

U.S. PATENT DOCUMENTS

| | | | | |
|---|---|---|---|---|
| 2003/0003932 | A1 | 1/2003 | Corrigan et al. | |
| 2004/0196858 | A1 * | 10/2004 | Tsai et al. ..................... | 370/401 |

FOREIGN PATENT DOCUMENTS

| | | | |
|---|---|---|---|
| CN | 1298242 | A | 6/2001 |
| CN | 1419382 | A | 5/2003 |
| CN | 1585514 | A | 2/2005 |
| CN | 1691793 | A | 11/2005 |
| CN | 101150584 | A | 3/2008 |
| CN | 101237623 | A | 8/2008 |
| CN | 101389065 | | 3/2009 |
| EP | 1 748 657 | A1 | 1/2007 |
| EP | 2 081 336 | A1 | 7/2009 |
| EP | 2081336 | A1 * | 7/2009 |
| EP | 2184897 | A1 * | 5/2010 |
| WO | WO 2009/015571 | * | 2/2009 |

OTHER PUBLICATIONS

International Search Report dated Jan. 20, 2011 in connection with International Patent Application No. PCT/CN2010/077716.

Written Opinion of the International Searching Authority dated Jan. 20, 2011 in connection with International Patent Application No. PCT/CN2010/077716.

Supplementary European Search Report dated Aug. 2, 2012 in connection with European Patent Application No. EP 10 82 3070.

Ramana Kumar K., et al., "Load balancing of services with server initiated connections", Personal Wireless Communications, Jan. 23, 2005, p. 254-257.

* cited by examiner

*Primary Examiner* — Steven Lim

(57) ABSTRACT

A device and a method for processing a short message service are capable of high-reliably processing a short message service. The device for processing a short message service includes a plurality of access units and a plurality of service processing units, where each of the access units is connected to the plurality of service processing units. The access unit is configured to receive the short message service and send it to one of the service processing units, and send out the processed short message service from the service processing unit. The service processing unit is configured to process the short message service, and send out the processed short message service through one of the access units.

8 Claims, 5 Drawing Sheets

DEVICE AND METHOD FOR PROCESSING SHORT MESSAGE SERVICE

CROSS-REFERENCE TO RELATED APPLICATIONS

This application is a continuation of International Application No. PCT/CN2010/077716, filed on Oct. 13, 2010, which claims priority to Chinese Patent Application No. 200910206835.1, filed with the Chinese Patent Office on Oct. 15, 2009, and entitled "DEVICE AND METHOD FOR PROCESSING SHORT MESSAGE SERVICE", both of which are incorporated herein by reference in its entirety.

TECHNICAL FIELD

The present invention relates to the field of mobile communications, and in particular, to a device and a method for processing a short message service.

BACKGROUND

Currently, the short message service has become one of the most commonly used services of cell phone subscribers. In addition to a large number of point-to-point short message services, short message services from information platforms on the Internet to cell phone subscribers are developing rapidly. A short message gateway may provide a safe and fast channel for data exchange between a service provider (Service Provider, SP) and a short message center, and implement functions such as SP convergence, routing management, accounting and authentication, and storage and forwarding, so the establishment thereof is quite necessary. Along with the rapid development of services, requirements on the short message gateway become higher and higher, which are mainly embodied as: (1) processing short messages in high capacity/high rate; (2) having high reliability; (3) having low total costs of ownership (TCO); and (4) being capable of expanding dynamically.

As shown in FIG. 1, a conventional static cluster short message gateway is shown, which may be understood as the superposition of single sets of short message gateway, for fixedly allocating different service flows to a certain set of device in the cluster through a load balancer. The static cluster gateway is a whole for the short message center and an Enterprise Customer/Service Integrator (Enterprise Customer/Service Integrator, EC/SI), instead of a gateway 1, a gateway 2 and the like shown in FIG. 1.

In the foregoing technique, a waiting status report entity (that is, an original message for being matched with a status report, where if the matching is successful, it indicates that a short message is sent successfully) of the EC/SI can only be saved in a memory or database of the device, for being matched after a status report entity (that is, a report message for indicating whether a terminal has received the message successfully) is returned from a lower-level network element, and therefore, the service flow of a single EC/SI can only be allocated on a certain gateway device. If some gateway is down, a related service using the gateway is interrupted, and when the corresponding status report is returned from the lower-level network element, the status matching cannot be performed, thereby having low reliability.

SUMMARY

An embodiment of the present invention provides a device for processing a short message service, which is capable of high-reliably processing a short message service.

A device for processing a short message service includes a plurality of access units and a plurality of service processing units, where each of the access units is connected to the plurality of service processing units;

the access unit is configured to receive a short message service and send it to one of the service processing units, and send out the processed short message service from the service processing unit; and the service processing unit is configured to process the short message service, and send out the processed short message service through one of the access units.

An embodiment of the present invention further provides a method for processing a short message service, which is capable of high-reliably processing a short message service.

A method for processing a short message service includes:

receiving, by a first access unit, a short message service;

sending, by the first access unit, the short message service to a first service processing unit; and processing, by the first service processing unit, the short message service, and sending out the processed short message service through any access unit;

where, the first access unit is obtained by selecting from more than two preset access units, and the first service processing unit is obtained by selecting from more than two preset service processing units.

By adopting the device and method for processing the short message service, one of more than two preset access units is capable of receiving the short message service and sending it to one of more than two preset service processing units, so, when a certain access unit or service processing unit is down, other access units or service processing units may still bear the work of the down access unit or service processing unit, thereby high-reliably processing the short message service.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons skilled in the art can derive other drawings from the accompanying drawings without creative efforts.

DETAILED DESCRIPTION

An embodiment of the present invention provides a device and a method for processing a short message service, which are capable of high-reliably processing a short message service.

The present invention is described in detail in the following with reference to the accompanying drawings. The embodiments to be described are only a part rather than all of the embodiments of the present invention. All other embodiments obtained by persons skilled in the art based on the embodiments of the present invention without creative efforts shall fall within the protection scope of the present invention.

Figure 1:
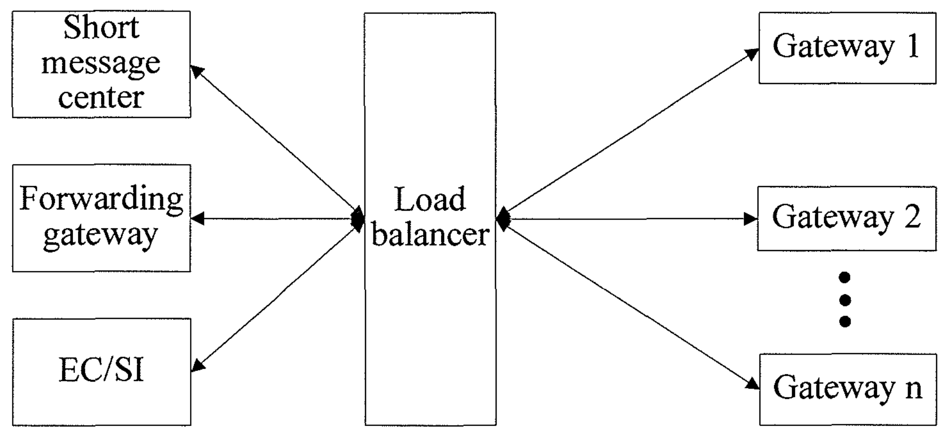
FIG. 1 is a schematic diagram of a conventional static cluster gateway.
Figure 2:
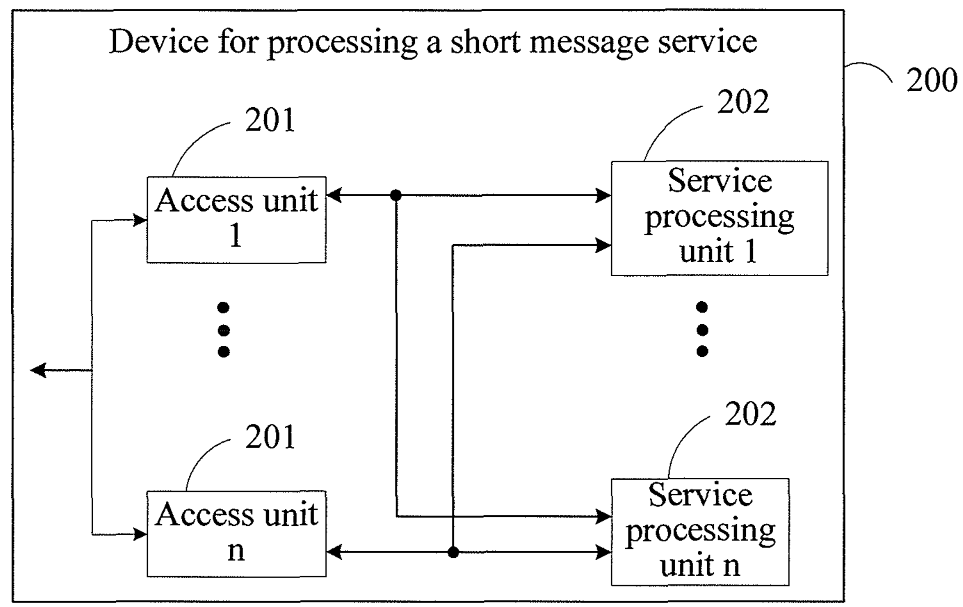
FIG. 2 is a structural diagram of a device for processing a short message service of an embodiment of the present invention.

As shown in FIG. 2, a device 200 for processing a short message service provided in an embodiment of the present invention includes a plurality of access units 201 and a plurality of service processing units 202, where each of the access units 201 is respectively connected with the plurality of service processing units 202. The access unit 201 is configured to receive a short message service and send it to one of the service processing units 202, and send out the processed short message service from the service processing unit 202. The service processing unit 202 is configured to process the short message service, and send out the processed short message service through one of the access units 201.

It should be understood that, the short message service herein may be a text short message service in the common sense, and may also be a multimedia message service or a short message service of another type. Moreover, according to actual application environments, the device 200 for processing the short message service may communicate with one or more external network elements. For example, when the device 200 for processing the short message service is used as an enhanced device of the conventional static cluster gateway, the device 200 for processing the short message service receives a short message service from an EC, processes the short message service, and sends the processed short message service to a short message center (in the case that the short message is sent to the local place) or a forwarding gateway (in the case that the short message is sent to another place).

In addition, in the device 200 for processing the short message service, all the access units 201 may provide the same processing capability to the external, and distribute, according to a load balance mechanism, tasks to one of the service processing units 202 currently working normally. If a certain access unit 201 goes down, any of other access units 201 is capable of bearing the load of the certain access unit 201 automatically. In addition, each of the service processing units 202 may have an equal processing capability.

When adopting a device 200 for processing the short message service, one of the plurality of access units 201 is capable of receiving the short message service and sending it to one of the plurality of service processing units 202, therefore, when a certain access unit 201 or service processing unit 202 goes down, other access units 201 or service processing units 202 may still take over the work of the down access unit 201 or service processing unit 202, thereby high-reliably processing the short message service, so that the device 200 for processing the short message service is highly extensible and may be on-line upgraded in real time.

Figure 3:
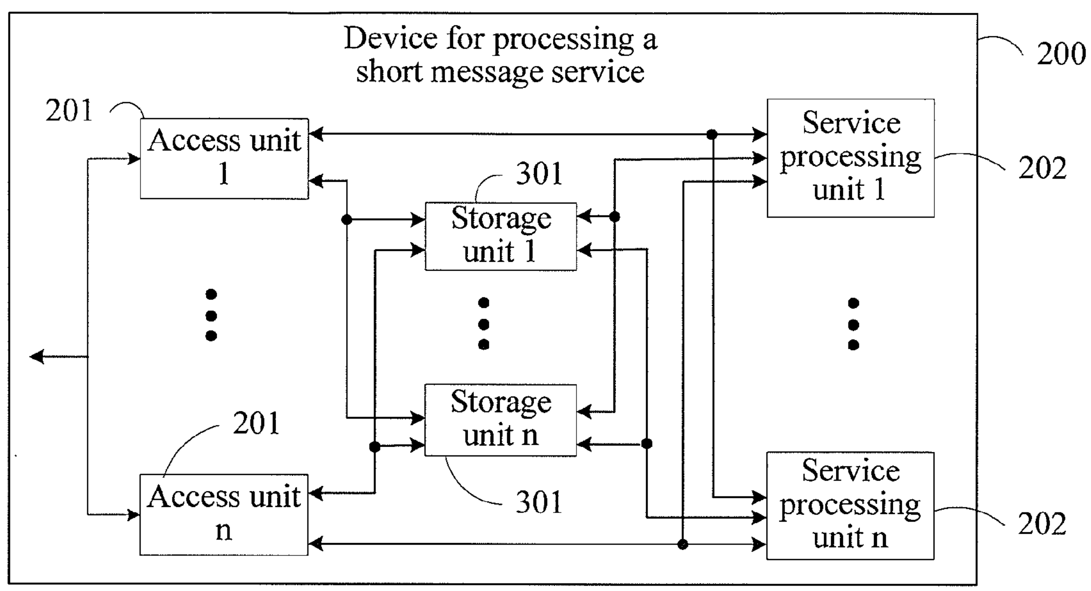
FIG. 3 is another structural diagram of a device for processing a short message service of an embodiment of the present invention.

Further, as shown in FIG. 3, a device 200 for processing the short message service may further include a plurality of storage units 301, and each storage unit 301 is configured to store a waiting status report entity. In such a case, a service processing unit 202 is further configured to, after sending out the processed short message service through one of the access units 201, generate a waiting status report entity, store the waiting status report entity in one of the storage units 301; receive a waiting status report entity that is sent by one of the access units 201 and obtained from the storage unit 301 and a status report that is received by the access unit 201 from the external of the device 200 for processing the short message service, match the two, and send out a matching result through one of the access units 201. By executing the foregoing operations, it can be determined whether the short message service is successfully sent to a cell phone or an application terminal.

In addition, the service processing unit 202 may be further configured to, after obtaining the matching result, clear the waiting status report entity that is in the storage unit 301 which has been used for matching the status report, thereby preventing the storage unit 301 from having no idle space to store a subsequent waiting status report entity.

Figure 4:
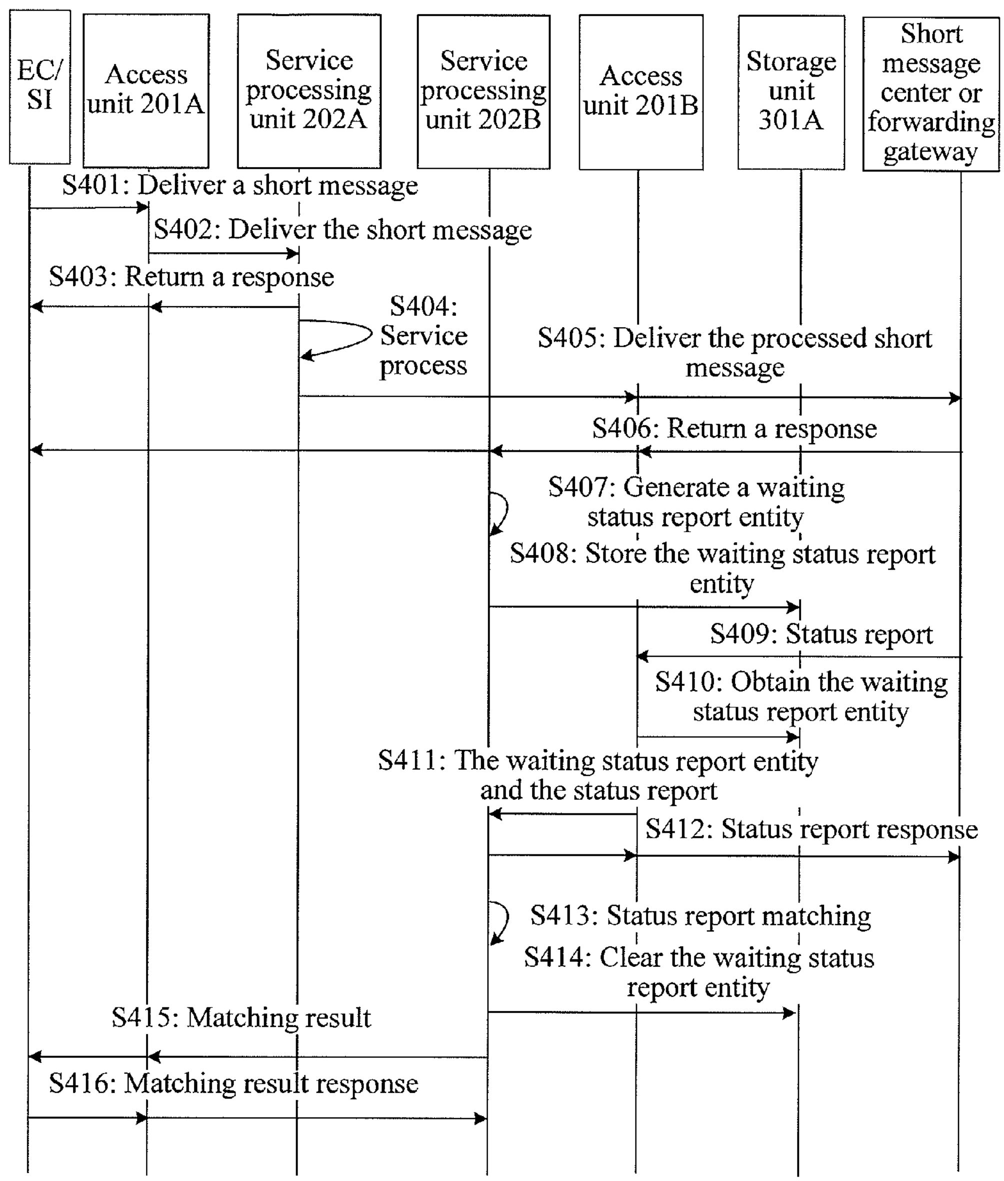
FIG. 4 is a work flow diagram of the device for processing a short message service shown in FIG. 3.

A work flow of the device 200 for processing the short message service is illustrated in the following by taking the device 200 for processing the short message service shown in FIG. 3 as an example. As shown in FIG. 4, the flow includes:

S401: an EC/SI delivers a short message service to one of access units 201A currently working normally;

S402: according to a load balance mechanism, the access unit 201A sends the short message service to one of service processing units 202A currently working normally;

S403: the service processing unit 202A sends a response to the EC/SI through the access unit 201A;

S404: the service processing unit 202A processes the short message service;

S405: if the access unit 201A goes down, the service processing unit 202A, according to a message destination address, delivers the processed short message to a short message center (in the case of sending the short message to the local place) or a forwarding gateway (in the case of sending the short message to another place) through one of access units 202B currently working normally;

S406: a response returned by the short message center or the forwarding gateway is sent to the EC/SI and a service processing unit 202B currently working normally through the access unit 202B currently working normally;

S407: the service processing unit 202B currently working normally generates a waiting status report entity;

S408: the service processing unit 202B currently working normally stores the waiting status report entity in one of storage units 301A;

S409: the access unit 201B currently working normally receives a status report from the short message center or the forwarding gateway;

S410: the access unit 201B currently working normally obtains the waiting status report entity from the storage unit 301A;

S411: the access unit 201B currently working normally, according to an internal mechanism, sends the waiting status report entity and the status report to one of the service processing units currently working normally, which is the service processing unit 202B;

S412: the service processing unit 202B sends a status report response message to the short message center or the forwarding gateway through the access unit 201B;

S413: the service processing unit 202B performs a matching process on the status report and the waiting status report entity;

S414: the service processing unit 202B clears the waiting status report entity in the storage unit 301A;

S415: the service processing unit 202B sends a matching result to the EC/SI through one of the access units currently working normally, which is the access unit 201A; and S416: the EC/SI sends a matching result response to the service processing unit 202B through one of the access units currently working normally, which is the access unit 201A.

By adopting the foregoing work flow, the processing of the short message service no longer depends on the operation situation of a certain service processing unit or access unit, so the reliability is improved, and when the device 200 for processing the short message service is used as a cluster gateway, the expandability of the cluster gateway is increased.

Figure 5:
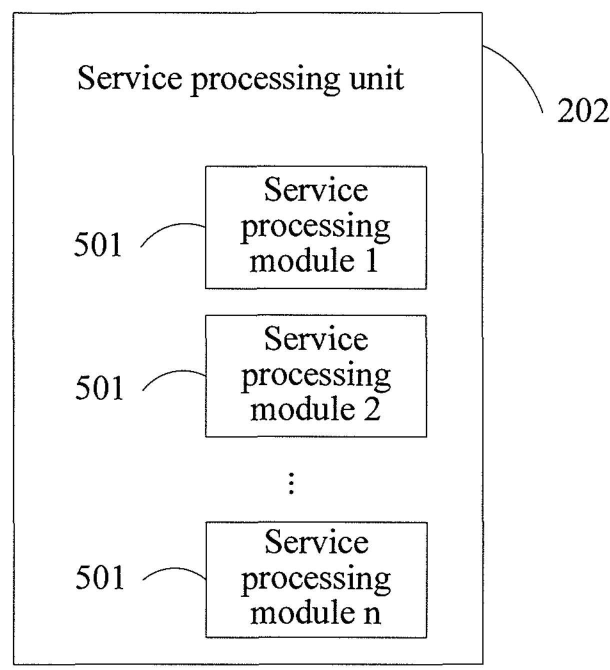
FIG. 5 is still another structural diagram of a device for processing a short message service of an embodiment of the present invention.

Further, as shown in FIG. 5, the service processing unit 202 includes a plurality of service processing modules 501. Each of the service processing modules 501 is respectively connected to the plurality of access units 201, and is configured to process the short message service (in the case of the device 200 for processing the short message service does not have storage units); or each of the service processing modules 501 is respectively connected to the plurality of access units 201 and respectively connected to the plurality of storage units 301, and is configured to process the short message service and perform the matching process of the waiting status report entity and the status report (in the case of the device 200 for processing the short message service includes the storage units). In this way, each of the service processing units 202 may be deployed at different places for different use. For example, one service processing unit 202 is used for a key account of business industry, and when a short message service comes from the key account of business industry, one of the service processing modules 501 currently working normally of the service processing unit 202 processes the short message service. For another example, another service processing unit 202 is used for a key account of education industry, and when a short message service comes from the key account of education industry, one of the service processing modules 501 currently working normally of the service processing unit 202 processes the short message service. Certainly, for an external EC/SI, there is no need to concern which service processing unit 202 is specifically accessed.

Figure 6:
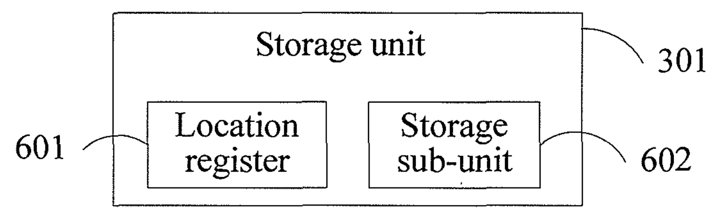
FIG. 6 is still another structural diagram of a device for processing a short message service of an embodiment of the present invention.

Further, as shown in FIG. 6, the storage unit 301 includes: a location register 601, configured to store location information of the waiting status report entity (such as, stored in which storage sub-unit 602); and a storage sub-unit 602, configured to store the waiting status report entity. At this time, the access unit 201 is specifically configured to, according to the uniqueness of a short message identity, obtain the location information of the waiting status report entity from the location register 601, and obtain the waiting status report entity from the corresponding storage sub-unit 602 according to the location information. Certainly, the access unit 201 may also be specifically configured to, according to the uniqueness of a short message identity, obtain the location information of the waiting status report entity from the location register 601, and send the location information to one of service processing units 202 currently working normally. The service processing unit 202 then obtains the waiting status report entity from the corresponding storage sub-unit 602 according to the location information.

Figure 7:
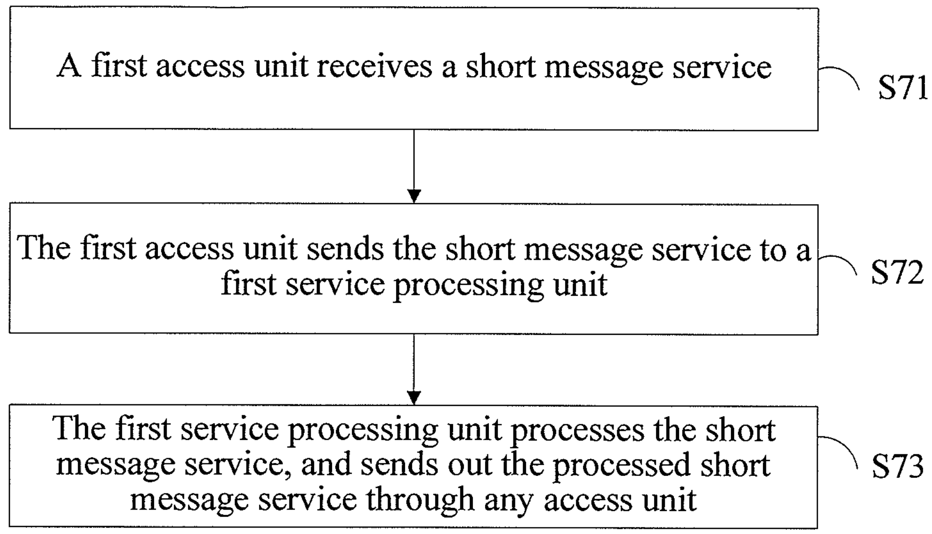
FIG. 7 is a flow chart of a method for processing a short message service of an embodiment of the present invention.

As shown in FIG. 7, a method for processing a short message service provided in an embodiment of the present invention includes:

S71: a first access unit receives a short message service;

S72: the first access unit sends the short message service to a first service processing unit; and S73: the first service processing unit processes the short message service, and sends out the processed short message service through any access unit;

where, the first access unit is obtained by selecting from at least two preset access units, and the first service processing unit is obtained by selecting from at least two preset service processing units.

It should be understood that, the short message service herein may be a text short message service in the common sense, and may also be a multimedia message service or a short message service of another type. Moreover, according to actual application environments, the access unit herein may implement the communication with one or more external network elements. For example, one of at least two preset access units receives a short message service from the EC and sends it to one of more than two preset service processing units, the service processing unit processes the short message service, and the service processing unit sends the processed short message service to a short message center (in the case that the short message is sent to the local place) or a forwarding gateway (in the case that the short message is sent to another place) through one of the more than two preset access units.

By adopting the method for processing the short message service, one of more than two preset access units is capable of receiving the short message service and sending it to one of more than two preset service processing units, so, when a certain access unit or service processing unit goes down, other access units or service processing units may still bear the work of the down access unit or service processing unit, thereby high-reliably processing the short message service.

Further, in step S71, the obtaining the first access unit by selecting from at least two preset access units is specifically: obtaining the first access unit by selecting from more than two preset access units according to a load balance mechanism.

Figure 8:
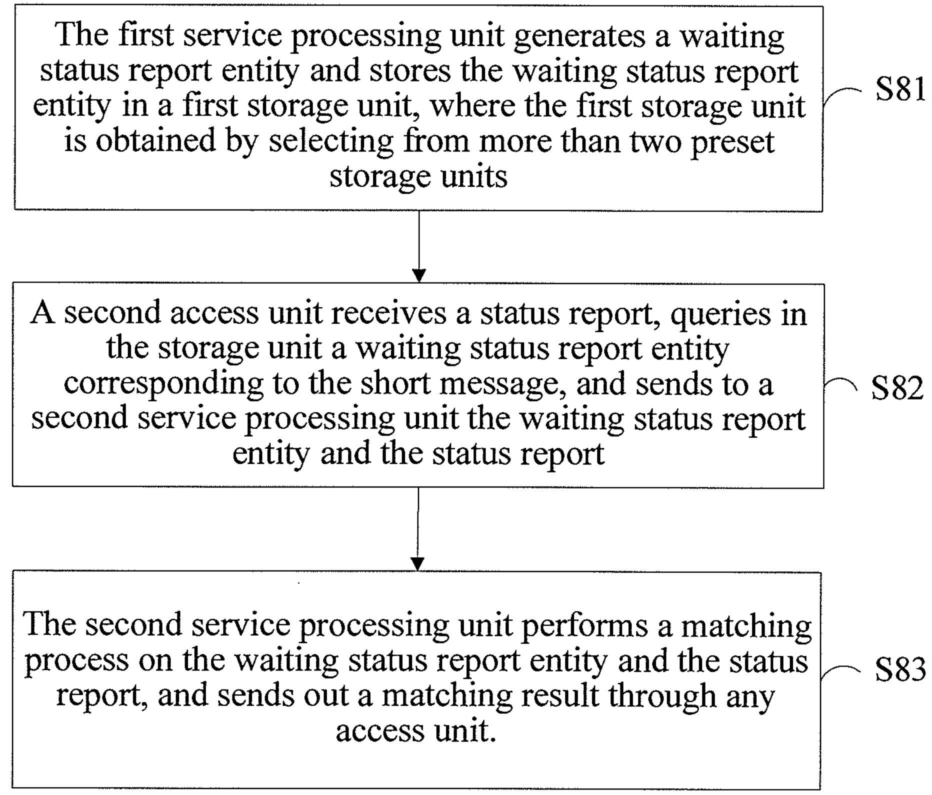
FIG. 8 is another flow chart of a method for processing a short message service of an embodiment of the present invention.

Further, as shown in FIG. 8, after step S73, the method further includes:

S81: the first service processing unit generates a waiting status report entity and stores the waiting status report entity in a first storage unit, where the first storage unit is obtained by selecting from more than two preset storage units; and S82: a second access unit receives a status report, queries in the storage unit for a waiting status report entity corresponding to the short message, and sends the waiting status report entity and the status report to a second service processing unit;

where, the querying in the storage unit for the waiting status report entity corresponding to the short message is specifically: according to the uniqueness of a short message identity, obtaining location information of the waiting status report entity, and obtaining from the storage message the waiting status report entity corresponding to the short message based on the location information.

Certainly, the step S82 may also be implemented as: the second access unit receives the status report and obtains the location information of the waiting status report entity (for example, which one of the more than two preset storage units is stored with the waiting status report entity) according to the uniqueness of the short message identity, the second access unit sends the location information and the status report to the second service processing unit, and the second service processing unit obtains the waiting status report entity from the corresponding storage unit according to the location information.

S83: the second service processing unit performs a matching process on the waiting status report entity and the status report, and sends out a matching result through any access unit.

It can be determined whether the short message service is successfully sent to the cell phone or application terminal by performing the steps S81 to S83.

Further, in step S83, after the performing, by the second service processing unit, the matching process on the waiting status report entity and the status report, the method further includes: clearing, by the second service processing unit, the waiting status report entity in the storage unit, thereby preventing the storage unit from having no idle space to store a subsequent waiting status report entity.

It should be understood that, the first access unit and the second access unit may be the same or different; the first service processing unit and the second service processing unit may be the same or different.

It should also be understood that, the device and method for processing a short message service described herein may be applied in a network element such as a gateway and a short message center.

Those skilled in the art should understand that all or apart of the flow of the method according to the embodiments of the present invention may be implemented by a computer program instructing relevant hardware. The program may be stored in a computer readable storage medium. When the program is run, the flows of the methods according to the embodiments of the present invention are performed. The storage medium may be a magnetic disk, an optical disk, a Read-Only Memory (Read-Only Memory, ROM), or a Random Access Memory (Random Access Memory, RAM).

The foregoing descriptions are merely several embodiments of the present invention, but not intended to limit the present invention. Various variations and modifications made by persons skilled in the art without departing from the spirit of the present invention fall within the scope of the present invention. Therefore, the protection scope of the present invention is subject to the appended claims.

What is claimed is:

1. A device for processing a short message service, the device comprising a plurality of access units and a plurality of service processing units, wherein each of the access units is connected to the plurality of service processing units;

wherein each of the access units is configured to receive a message from a short message service and send it to one of the service processing units, or send out a processed short message service from one of the service processing units; and wherein each of the service processing units is configured to process a message from a short message service received from one of the access units, and send out the processed short message service through one of the access units;

wherein the device further comprises a plurality of storage units, each of the storage units being configured to store a waiting status report entity;

wherein each of the service processing units is further configured to, after sending out the processed short message service through one of the access units, generate a first waiting status report entity, store the first waiting status report entity in one of the storage units; and/or receive a second waiting status report entity that is sent by one of the access units and obtained from one of the storage units, and a status report that is received by one of the access units from a network element external to the device, match the second waiting status report entity and the status report, and send out a matching result through one of the access units.

2. The device according to claim 1, wherein each of the service processing units is further configured to, after obtaining the matching result, clear the waiting status report entity that is in the storage unit and used for matching the status report.

3. The device according to claim 1, wherein each of the service processing units further comprises a plurality of service processing modules, wherein each of the service processing modules is connected to the plurality of access units, and is configured to process the short message service; or each of the service processing modules is connected to the plurality of access units and connected to the plurality of storage units, and is configured to process the short message service and perform a matching process of the waiting status report entity and the status report.

4. The device according to claim 1, wherein, the storage unit comprises:

a location register, configured to store location information of the waiting status report entity;

a storage sub-unit, configured to store the waiting status report entity; and the access unit is configured to, according to a short message identity, obtain the location information of the waiting status report entity from the location register, and obtain the waiting status report entity from a corresponding storage sub-unit according to the location information.

5. A method for processing a short message service, the method comprising:

receiving, by a first access unit, a short message service;

sending, by the first access unit, the short message service to a first service processing unit; and processing, by the first service processing unit, the short message service, and sending out the processed short message service through any access unit;

wherein, the first access unit is obtained by selecting from at least two preset access units, and the first service processing unit is obtained by selecting from at least two preset service processing units;

after sending out the processed short message service through any access unit, the method further comprises:

generating, by the first service processing unit, a waiting status report entity and storing the waiting status report entity in a first storage unit, wherein the first storage unit is obtained by selecting from at least two preset storage units;

receiving, by a second access unit, a status report, querying in the storage unit for a waiting status report entity corresponding to the short message, and sending the waiting status report entity and the status report to a second service processing unit; and performing, by the second service processing unit, a matching process on the waiting status report entity and the status report, and sending out a matching result through any access unit.

6. The method according to claim 4, wherein, the obtaining the first access unit by selecting from at least two preset access units comprises: obtaining the first access unit by selecting from at least two preset access units according to a load balance mechanism.

7. The method according to claim 5, wherein, the querying in the storage unit for the waiting status report entity corresponding to the short message comprises: according to uniqueness of a short message identity, obtaining location information of the waiting status report entity, and obtaining, from the storage message, the waiting status report entity corresponding to the short message based on the location information.

8. The method according to claim 5, wherein, after the performing, by the second service processing unit, the matching process on the waiting status report entity and the status report, the method further comprises: clearing, by the second service processing unit, the waiting status report entity in the storage unit.

* * * * *